(12) United States Patent
Bhardwaj et al.

(10) Patent No.: US 8,951,675 B2
(45) Date of Patent: Feb. 10, 2015

(54) GRAPHENE CURRENT COLLECTORS IN BATTERIES FOR PORTABLE ELECTRONIC DEVICES

(75) Inventors: Ramesh C. Bhardwaj, Fremont, CA (US); Richard M. Mank, Cupertino, CA (US)

(73) Assignee: Apple Inc., Cupertino, CA (US)

(*) Notice: Subject to any disclaimer, the term of this patent is extended or adjusted under 35 U.S.C. 154(b) by 130 days.

(21) Appl. No.: 13/273,116

(22) Filed: Oct. 13, 2011

(65) Prior Publication Data
US 2013/0095389 A1 Apr. 18, 2013

(51) Int. Cl.
*H01M 4/64* (2006.01)
*H01M 4/66* (2006.01)
*H01M 10/0562* (2010.01)

(52) U.S. Cl.
CPC .............. *H01M 4/663* (2013.01); *H01M 4/667* (2013.01); *H01M 4/668* (2013.01); *H01M 10/0562* (2013.01); *H01M 2220/30* (2013.01)
USPC ............................ 429/234; 429/233; 429/322

(58) Field of Classification Search
CPC . H01M 2/1673; H01M 4/0404; H01M 4/624; H01M 4/625; H01M 4/64; H01M 4/663; H01M 4/665–4/668
USPC ............ 429/209, 218.1, 231.8, 233, 234, 322
See application file for complete search history.

(56) References Cited

U.S. PATENT DOCUMENTS

| | | | |
|---|---|---|---|
| 5,736,271 A * | 4/1998 | Cisar et al. ...................... 429/96 |
| 2004/0048157 A1* | 3/2004 | Neudecker et al. ......... 429/231.2 |
| 2005/0079409 A1* | 4/2005 | Andelman et al. .............. 429/94 |
| 2007/0264575 A1* | 11/2007 | Wakita et al. .................. 429/232 |
| 2009/0162755 A1* | 6/2009 | Neudecker ..................... 429/319 |
| 2009/0325071 A1* | 12/2009 | Verbrugge et al. ............. 429/219 |
| 2011/0129722 A1* | 6/2011 | Yoneda .......................... 429/162 |
| 2011/0165466 A1 | 7/2011 | Zhamu et al. |
| 2011/0183203 A1* | 7/2011 | Du et al. ........................ 429/217 |

FOREIGN PATENT DOCUMENTS

| | | |
|---|---|---|
| WO | 2008124167 A1 | 10/2008 |
| WO | 2011057263 A1 | 12/2011 |

OTHER PUBLICATIONS

Gilje et al. A Chemical Route to Graphene for Device Applications. Nano Letters, vol. 7, No. 11, 2007, pp. 3394-3398 [online], [retrieved on Apr. 23, 2014]. Retrieved from the Internet <URL: http://pubs.acs.org/doi/pdf/10.1021/nl0717715>.*

* cited by examiner

*Primary Examiner* — Jonathan G Leong
*Assistant Examiner* — James Erwin
(74) *Attorney, Agent, or Firm* — Park, Vaughan, Fleming & Dowler LLP; Chia-Hsin Suen

(57) ABSTRACT

The disclosed embodiments provide a battery cell. The battery cell includes a cathode current collector containing graphene, a cathode active material, an electrolyte, an anode active material, and an anode current collector. The graphene may reduce the manufacturing cost and/or increase the energy density of the battery cell.

14 Claims, 5 Drawing Sheets

GRAPHENE CURRENT COLLECTORS IN BATTERIES FOR PORTABLE ELECTRONIC DEVICES

BACKGROUND

1. Field

The present embodiments relate to batteries for portable electronic devices. More specifically, the present embodiments relate to the use of graphene in the anode and/or cathode current collectors of batteries for portable electronic devices.

2. Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

Recent advances in battery technology have also led to the development of solid-state batteries, in which electrodes and a thin solid electrolyte are layered on top of a non-conducting substrate. Because the solid electrolyte takes up less space and/or weighs less than the liquid electrolyte of a comparable lithium-ion and/or lithium-polymer battery, the solid-state battery may have a higher energy density than the lithium-ion and/or lithium-polymer battery. In addition, the solid-state battery may be safer and/or more reliable than conventional lithium-ion and/or lithium-polymer batteries. For example, the use of a non-flammable, solid electrolyte in the solid-state battery may allow the solid-state battery to sidestep liquid electrolyte hazards such as spilling, boiling, gassing, and/or fires.

However, solid-state batteries are typically associated with much higher manufacturing costs than other types of batteries. For example, the cathode current collector of a solid-state battery may be made of an expensive metal such as gold or platinum. In addition, the layers of the solid-state battery may be formed using a complex and/or costly technique such as vacuum deposition. Consequently, manufacturing techniques for solid-state batteries may be cost-prohibitive to consumer applications of the solid-state batteries.

SUMMARY

The disclosed embodiments provide a battery cell. The battery cell includes a cathode current collector composed of graphene, a cathode active material, an electrolyte, an anode active material, and an anode current collector. The graphene may reduce the manufacturing cost and/or increase the energy density of the battery cell.

In some embodiments, the anode current collector is also composed of graphene.

In some embodiments, the cathode current collector is disposed on a non-conducting substrate. For example, the cathode current collector may be deposited onto the non-conducting substrate to form a solid-state battery cell. The electrolyte of the solid-state battery cell may also be a solid electrolyte. For example, the solid electrolyte may include lithium phosphorus oxynitride (LiPON). In addition, the cathode active material of the solid-state battery cell may include a lithium compound, and the anode active material of the solid-state battery cell may include lithium metal.

In some embodiments, the cathode current collector also contains a polyamide layer. The polyamide layer may be about two microns thick, and the graphene may be about one micron thick.

In some embodiments, the graphene is deposited on one or both sides of the polyamide layer.

In some embodiments, the cathode active material includes a lithium compound, and the anode active material includes graphite. For example, the lithium compound and graphite may be used in the cathode and anode active materials of a lithium-ion and/or lithium-polymer battery cell.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments relate to a battery cell. The battery cell may contain a cathode current collector, a cathode active material, an electrolyte, an anode active material, and an anode current collector. To increase the energy density and/or reduce the manufacturing cost of the battery, the cathode and/or anode current collectors may be composed of graphene. For example, a single layer of graphene may be used as a current collector in the battery cell in lieu of a more expensive and/or thicker material such as gold, platinum, aluminum, and/or copper. In addition, the graphene may be substituted for the cathode and/or anode current collectors in a variety of batteries, including solid-state batteries, lithium-ion batteries, and/or lithium-polymer batteries.

Figure 1:
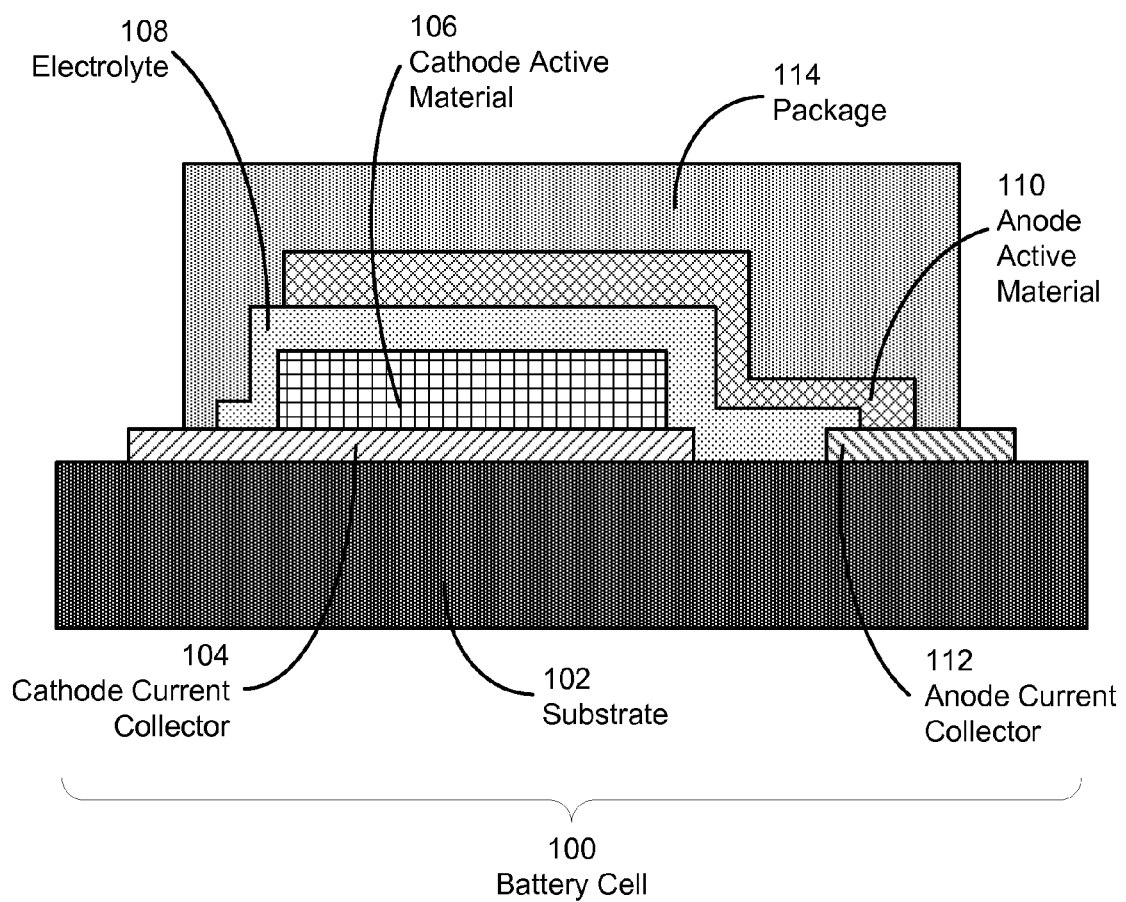
FIG. 1 shows a cross-sectional view of a battery cell in accordance with the disclosed embodiments.

FIG. 1 shows a cross-sectional view of a battery cell 100 in accordance with the disclosed embodiments. As shown in FIG. 1, battery cell 100 includes a substrate 102, a cathode current collector 104, a cathode active material 106, an electrolyte 108, an anode active material 110, and an anode current collector 112.

More specifically, FIG. 1 shows a cross-sectional view of a solid-state battery cell 100. The components of battery cell 100 may be formed by depositing layers of different materials onto substrate 102 and/or one another. For example, substrate 102 may correspond to a non-conducting substrate such as mica, polyamide, and/or polyether ether ketone (PEEK). A vacuum deposition technique may be used to deposit cathode current collector 104 as a layer of platinum and/or gold onto substrate 102 and anode current collector 112 as a layer of copper onto substrate 102. Next, a sputtering technique may be used to deposit a lithium compound corresponding to cathode active material 106 onto cathode current collector 104, along with a thin film of lithium phosphorus oxynitride (LiPON) corresponding to a solid electrolyte 108 over cathode current collector 104, cathode active material 106, substrate 102, and/or anode current collector 112. A layer of lithium may then be thermally evaporated onto the LiPON to form anode active material 110. Finally, battery cell 100 may be sealed in a protective package 114 such as a polymer frame and/or flexible pouch.

Those skilled in the art will appreciate that the materials and/or techniques described above may cause battery cell 100 to be significantly more expensive to produce than other types of batteries, such as lithium-ion and/or lithium-polymer batteries. For example, a gold and/or platinum cathode current collector 104 in battery cell 100 may be associated with a higher materials cost than an aluminum cathode current collector in a lithium-ion and/or lithium-polymer battery. Similarly, the vacuum deposition and/or sputtering techniques used to form battery cell 100 may be more complex and/or costly than the stacking, rolling, and/or sealing techniques used to manufacture lithium-ion and/or lithium-polymer batteries. In turn, the manufacturing cost of battery cell 100 may be prohibitive to the use of battery cell 100 in portable electronic devices such as laptop computers, mobile phones, tablet computers, portable media players, and/or digital cameras.

In one or more embodiments, the manufacturing cost of battery cell 100 is reduced by substituting graphene for metals used in cathode current collector 104 and/or anode current collector 112. More specifically, a graphene monolayer with a high electrical conductivity and/or tensile strength may be deposited on substrate 102 as cathode current collector 104 and/or anode current collector 112 in lieu of metals such as platinum, gold, and/or copper. For example, the graphene monolayer may be formed on copper and/or nickel foil and transferred to substrate 102 by dissolving the foil in a solution and spraying the solution onto substrate 102. The graphene monolayer may remain on substrate 102 after the solution evaporates. After the graphene monolayer is deposited onto substrate 102, the remainder of battery cell 100 may be formed by disposing cathode active material 106, electrolyte 108, anode active material 110, and/or package 114 over substrate 102 and/or the graphene monolayer.

Graphene may also be used in the cathode and/or anode current collectors of other types of batteries, such as lithium-ion and/or lithium-polymer batteries. As discussed below, the graphene may increase the energy densities of the batteries by decreasing the thicknesses of the cathode and/or anode current collectors.

Figure 2:
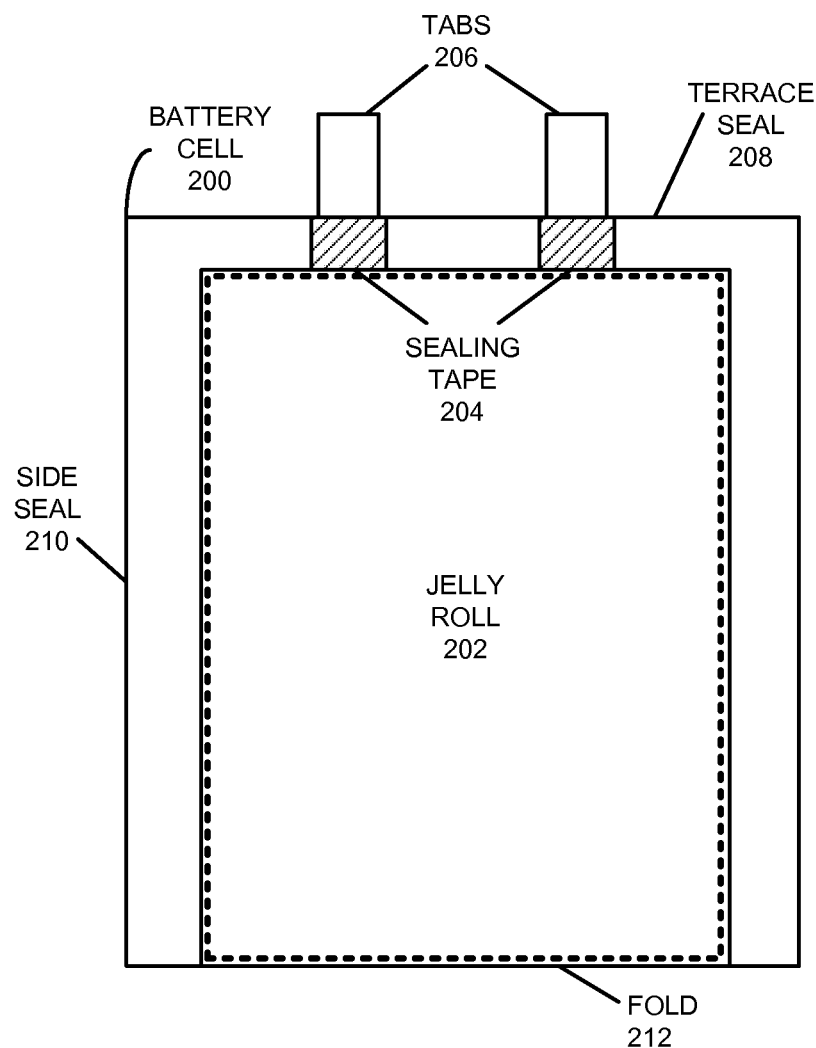
FIG. 2 shows a top-down view of a battery cell in accordance with the disclosed embodiments.

FIG. 2 shows a top-down view of a battery cell 200 in accordance with the disclosed embodiments. Battery cell 200 may correspond to a lithium-polymer cell that is used to power a portable electronic device. Battery cell 200 includes a jelly roll 202 containing a number of layers which are wound together, including a cathode with an active coating, a separator, and an anode with an active coating. More specifically, jelly roll 202 may include one strip of cathode material (e.g., aluminum foil coated with a lithium compound) and one strip of anode material (e.g., copper foil coated with carbon) separated by one strip of separator material (e.g., conducting polymer electrolyte). As discussed below with respect to FIGS. 3-4, graphene may be used in lieu of the metals in the cathode and/or anode to increase the energy density of battery cell 200. The cathode, anode, and separator layers may then be wound on a mandrel to form a spirally wound structure. Jelly rolls are well known in the art and will not be described further.

During assembly of battery cell 200, jelly roll 202 is enclosed in a flexible pouch, which is formed by folding a flexible sheet along a fold line 212. For example, the flexible sheet may be made of aluminum with a polymer film, such as polypropylene and/or polyethylene. After the flexible sheet is folded, the flexible sheet can be sealed, for example by applying heat along a side seal 210 and along a terrace seal 208.

Jelly roll 202 also includes a set of conductive tabs 206 coupled to the cathode and the anode. Conductive tabs 206 may extend through seals in the pouch (for example, formed using sealing tape 204) to provide terminals for battery cell 200. Conductive tabs 206 may then be used to electrically couple battery cell 200 with one or more other battery cells to form a battery pack. For example, the battery pack may be formed by coupling the battery cells in a series, parallel, or series-and-parallel configuration.

Figure 3:
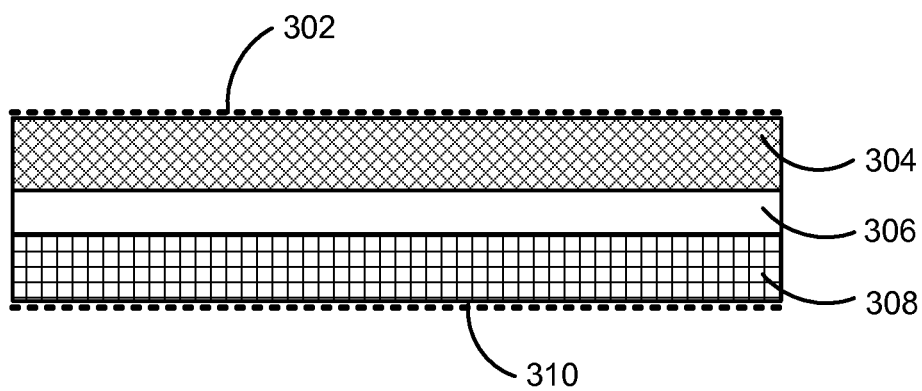
FIG. 3 shows a set of layers for a battery cell in accordance with the disclosed embodiments.

FIG. 3 shows a set of layers for a battery cell in accordance with the disclosed embodiments. The battery cell may correspond to a lithium-ion and/or lithium-polymer battery cell that is used to power a portable electronic device such as a mobile phone, laptop computer, tablet computer, portable media player, and/or digital camera. The layers may be wound to create a jelly roll for the battery cell, such as jelly roll 202 of FIG. 2. Alternatively, the layers may be used to form other types of battery cell structures, such as bi-cell structures.

The layers may include a cathode current collector 302, a cathode active material 304, a separator 306, an anode active material 308, and an anode current collector 310. As mentioned above, cathode current collector 302 may be aluminum foil, cathode active material 304 may be a lithium compound (e.g., lithium cobalt oxide), anode current collector 310 may be copper foil, anode active material 308 may be carbon (e.g., graphite), and separator 306 may include polypropylene and/or polyethylene.

In addition, the energy density of the battery cell may be influenced by the relative thicknesses of the layers. For example, the active components of the battery cell may include 100-micron-thick layers of cathode active material 304 and anode active material 308. On the other hand, the non-active components may include an aluminum cathode current collector 302 that is 15 microns thick, a polypropylene separator 306 that is 16-20 microns thick, and a copper anode current collector 310 that is 10 microns thick. The presence of non-active components in the battery cell may reduce the energy density of the battery cell, while the thicknesses of the non-active components may be limited by the manufacturing processes associated with the non-active components.

To increase the energy density of the battery cell, cathode current collector 302 and/or anode current collector 310 may be composed of graphene instead of metal foils. More specifically, the high current-carrying capacity and tensile strength of graphene may provide the charge-collecting functionality of cathode current collector 302 and/or anode current collector 310 at a thickness of one angstrom to a few microns instead of 10-15 microns.

For example, a graphene monolayer may be deposited directly on cathode active material 304 and/or anode active material 308 to form cathode current collector 302 and/or anode current collector 310. Alternatively, cathode current collector 302 and/or anode current collector 310 may be formed by depositing graphene onto one side of a two-micron-thick layer of polyamide. The polyamide layer may then be disposed above cathode active material 304 (e.g., with the graphene facing down) such that the deposited graphene contacts cathode active material 304. Similarly, the polyamide layer may be disposed below anode active material 308 (e.g., with the graphene facing up) in a way that allows the deposited graphene to contact anode active material 308. As discussed in further detail below with respect to FIG. 4, the graphene may also be deposited on both sides of the polyamide layer to form a two-sided current collector for the battery cell.

Figure 4:
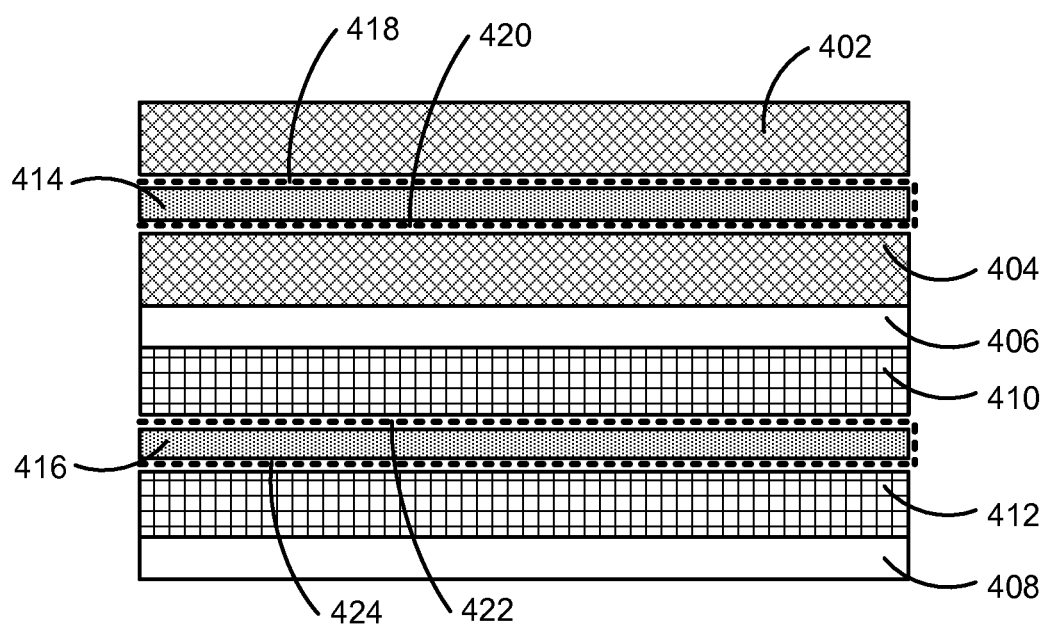
FIG. 4 shows a set of layers for a battery cell in accordance with the disclosed embodiments.

FIG. 4 shows a set of layers for a battery cell in accordance with the disclosed embodiments. As with the battery cell of FIG. 3, the layers may be used in a lithium-ion and/or lithium-polymer battery cell. In addition, the layers may be stacked and/or wound to create a jelly roll, bi-cell, and/or other battery cell structure.

In particular, the battery cell of FIG. 4 includes two layers of cathode active material 402-404, two layers of separator 406-408, and two layers of anode active material 410-412. Cathode active material 402-404 may contain a lithium compound, separator 406-408 may contain polypropylene and/or polyethylene, and anode active material 410-412 may contain carbon. The layers of separator 406-408 may be formed from a single sheet of separator material by placing the sheet underneath both layers of anode active material 410-412, folding the sheet over the top of anode active material 410, and placing both layers of cathode active material 402-404 over the folded portion.

In addition, two current collectors are sandwiched between the layers of cathode active material 402-404 and anode active material 410-412, respectively. As shown in FIG. 4, each current collector includes a layer of polyamide 414-416 that is covered on both sides by graphene 418-424. The layers of graphene 418-424 may additionally be connected at the ends of the polyamide 414-416 layers to form a continuous current collector instead of two disparate current collectors. For example, the cathode current collector may include polyamide 414 and graphene 418-420 layers, while the anode current collector may include polyamide 416 and graphene 422-424 layers. Graphene 418-420 layers may be connected to the right of polyamide 416, allowing the cathode current collector to conduct current to and from both layers of cathode active material 402-404. Graphene 422-424 layers may similarly be connected to the right of polyamide 416, allowing the anode current collector to conduct current to and from both layers of anode active material 410-412.

The composition of the cathode and anode current collectors may allow the current collectors to occupy a fraction of the thickness of comparable metal current collectors within the battery cell. In turn, the reduced thickness of the current collectors may increase the energy density of the battery cell and facilitate the use of a portable electronic device with the battery cell. For example, a total of one micron of graphene 418-424 may be deposited onto a two-micron thick layer of polyamide 414-416 to form a three-micron-thick cathode and/or anode current collector for the battery cell. In contrast, an aluminum cathode current collector may be manufactured with a minimum thickness of 15 microns, and a copper anode current collector may be manufactured with a minimum thickness of 10 microns.

Figure 5:
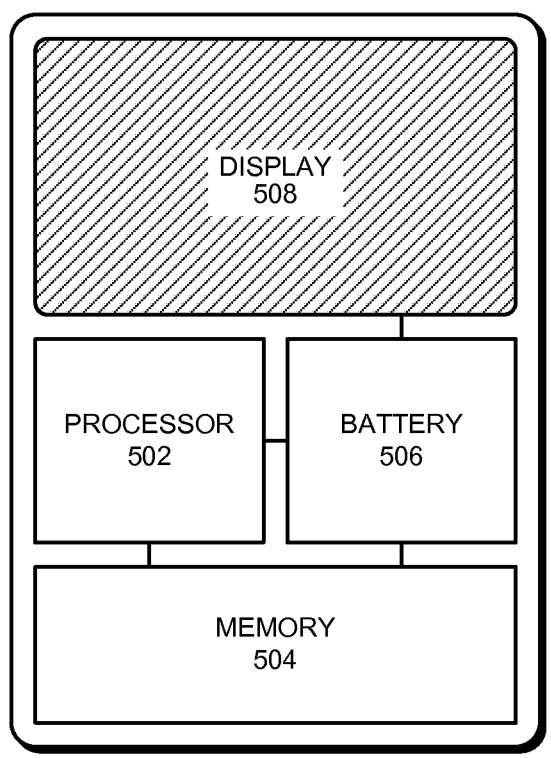
FIG. 5 shows a portable electronic device in accordance with the disclosed embodiments.

The above-described rechargeable battery cell can generally be used in any type of electronic device. For example, FIG. 5 illustrates a portable electronic device 500 which includes a processor 502, a memory 504 and a display 508, which are all powered by a battery 506. Portable electronic device 500 may correspond to a laptop computer, mobile phone, PDA, tablet computer, portable media player, digital camera, and/or other type of battery-powered electronic device. Battery 506 may correspond to a battery pack that includes one or more battery cells. Each battery cell may include a cathode current collector, a cathode active material, an electrolyte, an anode active material, and an anode current collector. The cathode and/or anode current collectors may include graphene. In addition, the graphene may be disposed on a non-conducting substrate and/or on one or both sides of a polyamide layer.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
   a cathode active material;
   a cathode current collector;
   an electrolyte;
   an anode active material; and
   an anode current collector;
   wherein the cathode current collector comprises a layer of polyamide covered on each side by only one graphene monolayer, wherein the only one graphene monolayer on each side of the polyamide layer is sandwiched by the polyamide layer and the cathode active material, and wherein the only one graphene monolayer from each side of the polyamide layer is connected with each other at the end of the polyamide layer to form a continuous current collector.

2. The battery cell of claim 1, wherein the cathode current collector is disposed on a non-conducting substrate.

3. The battery cell of claim 2, wherein the electrolyte is a solid electrolyte.

4. The battery cell of claim 3, wherein the solid electrolyte comprises lithium phosphorus oxynitride (LiPON).

5. The battery cell of claim 2,
wherein the cathode active material comprises a lithium compound, and
wherein the anode active material comprises lithium metal.

6. The battery cell of claim 1,
wherein the polyamide layer is about two microns thick.

7. The battery cell of claim 1,
wherein the cathode active material comprises a lithium compound, and
wherein the anode active material comprises graphite.

8. A portable electronic device, comprising:
a set of components powered by a battery pack; and
the battery pack, comprising:
a battery cell, comprising:
a cathode active material;
a cathode current collector;
an electrolyte;
an anode active material; and
an anode current collector;
wherein the cathode current collector comprises a layer of polyamide covered on each side by only one graphene monolayer, wherein the only one graphene monolayer on each side of the polyamide layer is sandwiched by the polyamide layer and the cathode active material, and wherein the only one graphene monolayer from each side of the polyamide layer is connected with each other at the end of the polyamide layer to form a continuous current collector.

9. The battery cell of claim 1, wherein the cathode current collector is disposed on a non-conducting substrate.

10. The portable electronic device of claim 9, wherein the electrolyte is a solid electrolyte.

11. The portable electronic device of claim 10, wherein the solid electrolyte comprises lithium phosphorus oxynitride (LiPON).

12. The portable electronic device of claim 9,
wherein the cathode active material comprises a lithium compound, and
wherein the anode active material comprises lithium metal.

13. The portable electronic device of claim 8,
wherein the polyamide layer is about two microns thick.

14. The portable electronic device of claim 8,
wherein the cathode active material comprises a lithium compound, and
wherein the anode active material comprises graphite.

* * * * *